(12) United States Patent
Akaoka et al.

(10) Patent No.: US 6,370,166 B1
(45) Date of Patent: Apr. 9, 2002

(54) METHOD OF ENABLING LASER LIGHT TO PROPAGATE THROUGH A MEDIUM OVER LONG DISTANCE BY MEANS OF CONTROLLING ITS WAVEFRONT

(75) Inventors: Katsuaki Akaoka; Yoichiro Maruyama; Takashi Arisawa, all of Ibaraki-ken (JP)

(73) Assignee: Japan Atomic Energy Research Institute, Tokyo (JP)

( * ) Notice: Subject to any disclaimer, the term of this patent is extended or adjusted under 35 U.S.C. 154(b) by 0 days.

(21) Appl. No.: 09/392,589

(22) Filed: Sep. 9, 1999

(30) Foreign Application Priority Data

Sep. 9, 1998 (JP) .......................................... 10-254926

(51) Int. Cl.$^7$ ................................................. H01S 3/10
(52) U.S. Cl. ............................ 372/20; 372/99; 372/32; 372/29.02; 372/38.01
(58) Field of Search ............................ 372/69, 20, 81, 372/31, 84, 82, 29, 99, 39, 29.02, 38.01; 359/53

(56) References Cited

U.S. PATENT DOCUMENTS 5,497,254 A * 3/1996 Amako et al. ................. 359/53

OTHER PUBLICATIONS

Proceedings of the Society of Photo–Optical Instrumentation Engineers, Akaoka et al., vol. 2375, p. 72, 1995.

Proceedings of the Society of Photo–Optical Instrumentation Engineers, Akaoka et al., vol. 2986, p. 56, 1997.

* cited by examiner

Primary Examiner—Leon Scott, Jr.
(74) Attorney, Agent, or Firm—Banner & Witcoff, Ltd.

(57) ABSTRACT

The wavefront of laser light as it propagates through a medium is controlled so that not only the inherent aberrations in the wavefront of the laser light itself but also the aberrations that are progressively caused by passage of laser light through the medium are effectively corrected to achieve long-distance propagation of the laser light through the medium.

10 Claims, 6 Drawing Sheets

METHOD OF ENABLING LASER LIGHT TO PROPAGATE THROUGH A MEDIUM OVER LONG DISTANCE BY MEANS OF CONTROLLING ITS WAVEFRONT

BACKGROUND OF INVENTION

This invention relates to a method of enabling laser light to propagate through a medium over long distance by means of controlling its wavefront. The application of the method is not limited to the field where laser light need be propagated over a long distance; it is also applicable to other laser systems including atomic vapor laser isotope separation, molecular laser isotope separation, X-ray laser, laser acceleration, solid-state laser, short-pulse laser and frequency conversion of laser light by crystals devices.

Figure 1A:
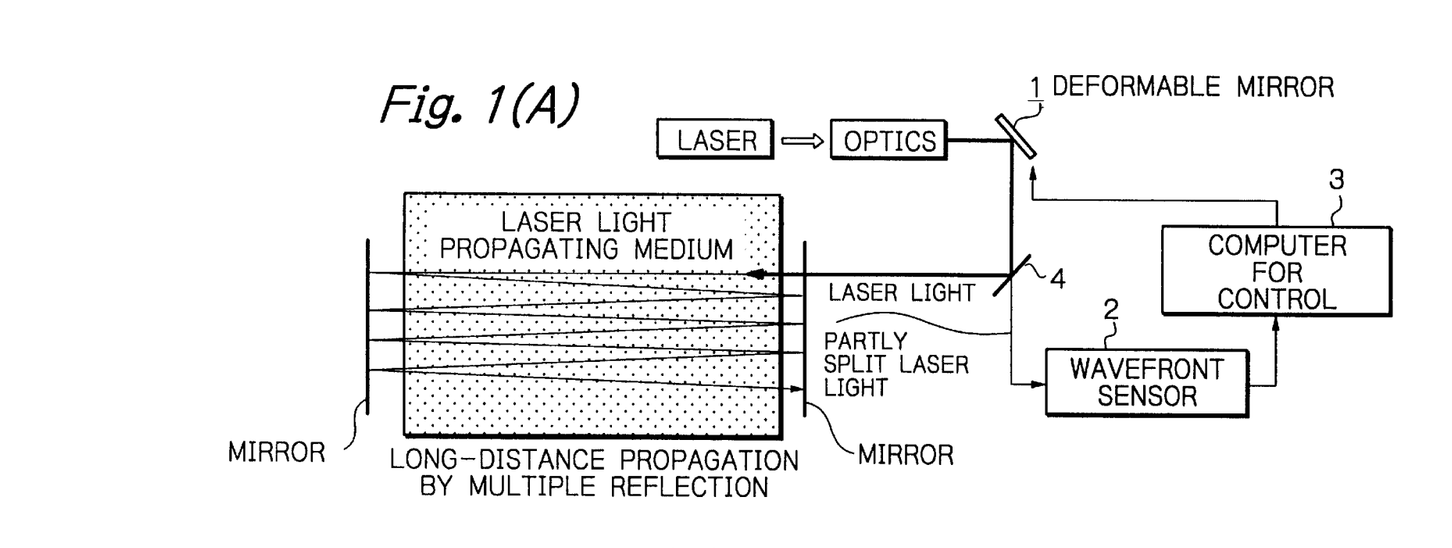
FIGS. 1(A) and (B) shows a prior art method of wavefront control, in which the wavefront of laser light just before entrance to a medium is measured and controlled.

Laser light propagation as in atomic vapor laser isotope separation, molecular laser isotope separation, X-ray laser and laser acceleration is a field that has not been fully commercialized and theory has not even been established that allows laser light to propagate over a long distance. At conceptual stage, a method has been proposed that "measures and controls the wavefront of laser light before it is launched into a medium". Details of this idea are given below with reference to FIG. 1.

One or more beams of laser light are first incident on a deformable mirror 1 and reflected from it. Part of the reflected laser light is split out by means of a beam splitter 4 and its wavefront is measured with a wavefront sensor 2. On the basis of the measured wavefront data, the required amount of deformation of the deformable mirror 1 is calculated with a computer for control 3 and the deformable mirror 1 is deformed to control the wavefront of the laser light. The laser light having the thus controlled wavefront is allowed to be launched into a medium and propagate through it homogeneously (see FIG. 1(A)).

Figure 1B:
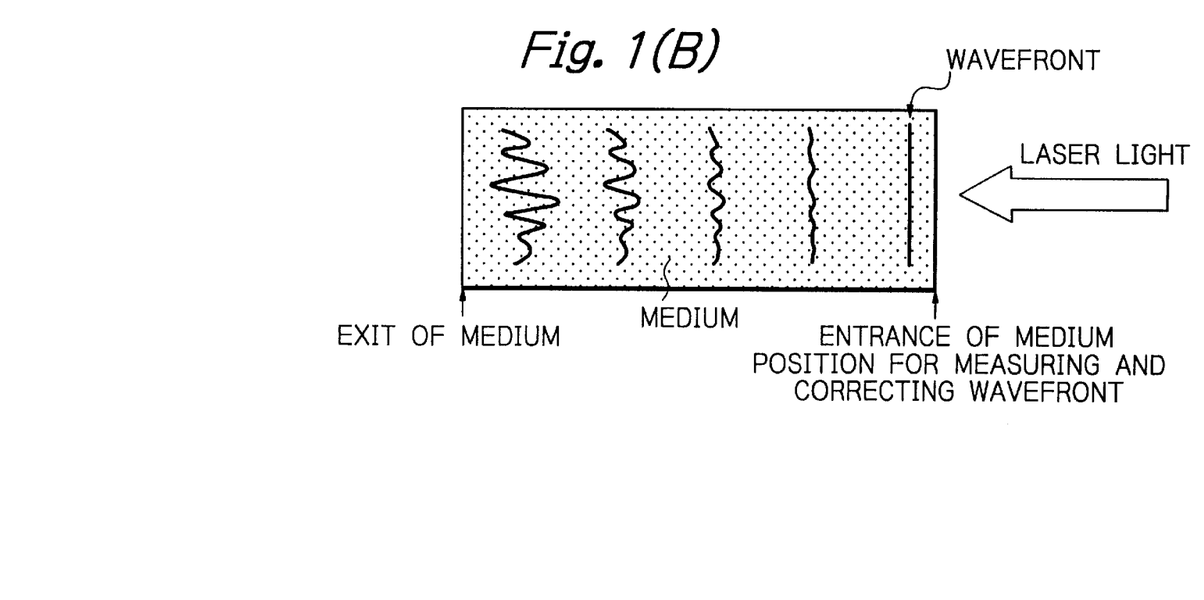

In this method, the laser light just incident on the medium is controlled to have a planar or any other wavefront that is optimal for propagation. However, as the laser light propagates through the medium, its wavefront becomes progressively aberrant and undergoes the greatest aberration when it emerges from the medium (see FIG. 1(B)). The method shown in FIG. 1 is characterized by providing both the wavefront sensor and the deformable mirror at the entrance of the medium and controlling the wavefront of the laser light as it is about to be launched into the medium.

In order to perform laser isotope separation on an industrial basis, the interaction between laser light and medium has to be increased. In other laser propagation applications, the beam size of laser light increases as more power is output. As a result, laser light of a large beam size has to be propagated and this inevitably increases the interaction between laser light and medium. However, the wavefront of the laser light changes in the process of propagation and it cannot propagate over the required distance. Hence, it has been held extremely difficult to meet the requirement for increased interaction between laser light and medium.

Figure 2:
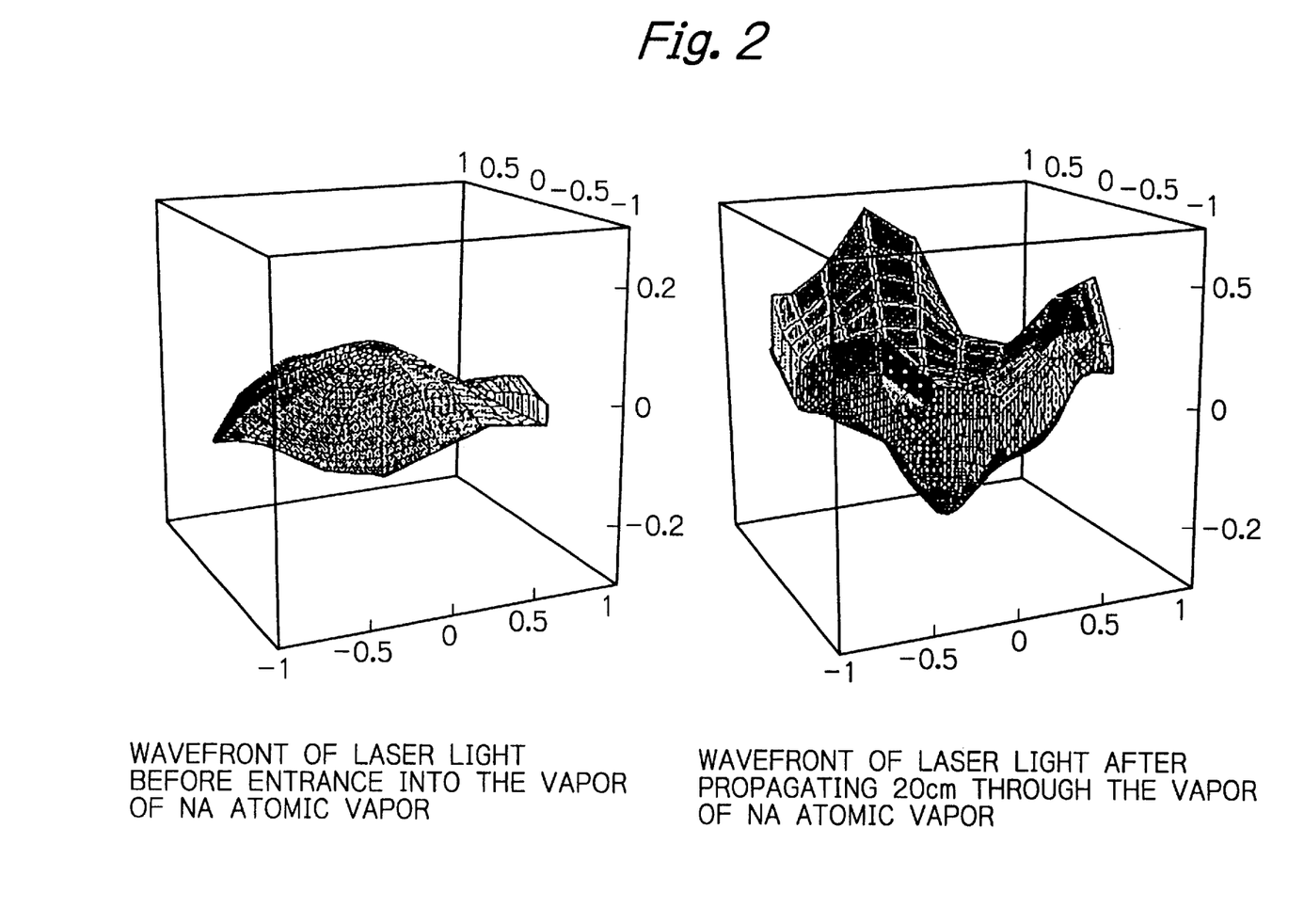
FIG. 2 shows the wavefront of laser light both before and after entrance to the medium.

The conventional approach for realizing the propagation of laser light over the required distance is by controlling the wavefront of the laser light on the basis of its measurement in a position just before incidence on the medium. However, recent studies have revealed that factors that interfere with the propagation of laser light include not only aberrations introduced into the wavefront of the laser light due to its own fluctuations but also aberrations due to fluctuations in the medium through which it travels and its interaction with the medium (see FIG. 2 and Proceedings of the Society of Photo-Optical Instrumentation Engineers, vol. 2375, p. 72, 1995).

An attempt to be described just below was therefore made to realize long-distance propagation of laser light by positively controlling its wavefront as it travelled through a medium so that the effects of aberrations and fluctuations the medium caused to the wavefront were effectively eliminated.

When one tries to sustain the reaction between laser light and medium over a long distance, the laser light itself undergoes modulation due to the density distribution of the medium through which it propagates, an optically active state induced by the laser light itself, as well as the spatial and temporal changes in such factors as the optical intensity, phase and pulse waveform of the laser light. As a result, the volume or quantity of reaction between the laser light and the medium changes and the reaction itself becomes inhomogenous, making it impossible for the laser light to propagate through the medium homogeneously over a long distance.

Figure 3:
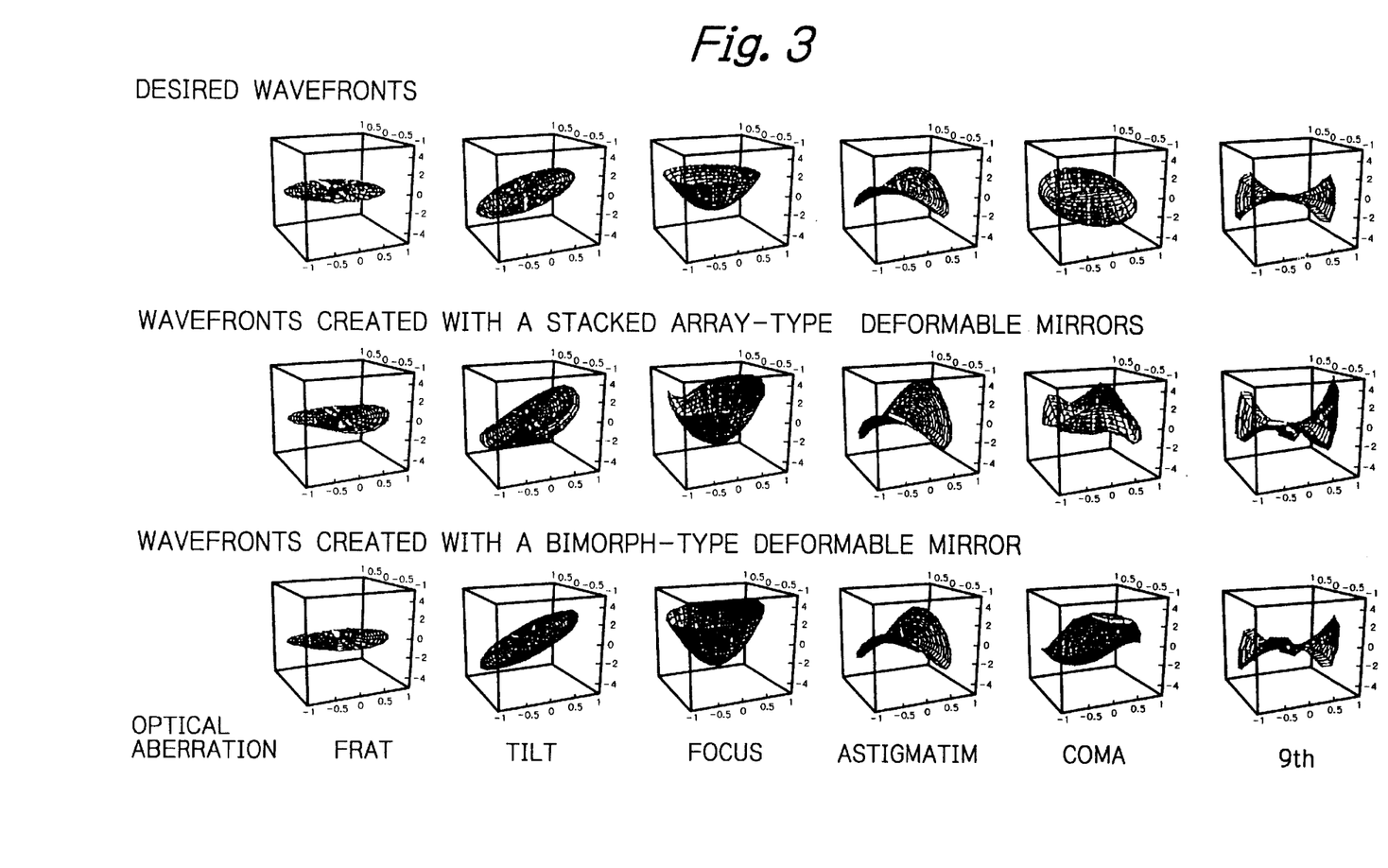
FIG. 3 shows various wavefronts created with a wavefront controller.

The wavefront control technique under consideration makes particular note of the wavefront which represents the change in the phase of laser light propagating through a medium and positively controls and corrects the wavefront of the propagating laser light, thereby enabling it to propagate through the medium over a long distance. The apparatus proposed for implementing this technique is capable of controlling the laser light to have various non-planar wavefronts (see FIG. 3 and Proceedings of the Society of Photo-Optical Instrumentation Engineers, vol. 2986, p. 56, 1997).

Figure 4:
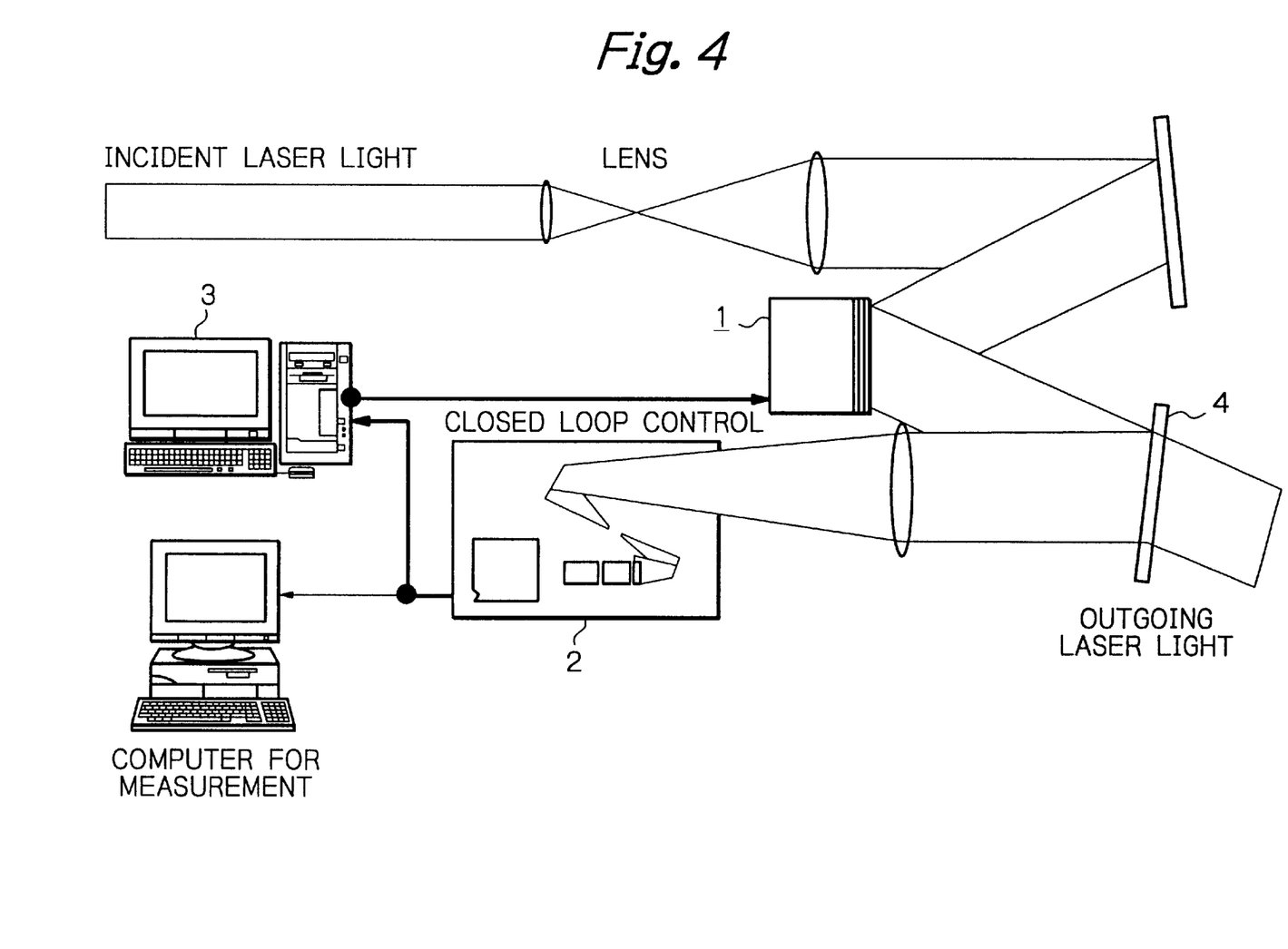
FIG. 4 shows the setup of the wavefront controller.

A setup of the apparatus is shown in FIG. 4. It is composed of a deformable mirror 1 which is capable of changing its surface geometry to produce a corresponding change in the wavefront of laser light, a wavefront sensor 2 for measuring the wavefront of laser light, and a control computer for wavefront 3 that executes a wavefront control algorithm it has. First, part of the laser light incident on the deformable mirror 1 and reflected from it is split out with a beam splitter 4 and supplied to the wavefront sensor 2 for wavefront measurement. On the basis of the result of the measurement, the surface geometry of the deformable mirror is changed and the resulting change in the wavefront of the laser light is controlled with a closed loop.

Laser light undergoes spatial and temporal changes in optical intensity, phase, pulsed wave, shape and so forth due partly to the thermal strain from lasing media such as crystals and dyes in the laser apparatus, lens, mirror and other optical elements and to the vibrations from the flow of dyes, cooling water, etc. Conventionally, it was believed that laser light could propagate over a long distance if the wavefront aberrations inherent in the laser light itself were controlled appropriately. However, this approach only intends to control the wavefront of laser light as it enters the medium and no consideration is given to the change in wavefront that may occur due to the interaction between the laser light and the medium. As a result, it is impossible to permit the laser light to propagate over a long distance.

SUMMARY OF THE INVENTION

An object, therefore, of the present invention is to provide a method by which the wavefront of laser light travelling through a medium is corrected in the process of propagation so as to correct not only the aberrations in wavefront that are inherent in the laser light but also those which occur as it travels through the medium.

One method of attaining this object comprises the steps of propagating laser light through a medium, picking up all laser light at a suitable site in the medium through which it is propagating, illuminating a deformable mirror with the laser light, splitting out a portion of the laser light reflected from the deformable mirror, measuring the wavefront of the split laser light with a wavefront sensor, calculating the required amount of deformation of the mirror on the basis of the result of measurement, deforming the mirror by the calculated amount so as to control the wavefront of the laser light, and allowing the laser light with the controlled wavefront to be admitted again into the medium so that it propagates over the remainder of the path through the medium. In this way, the wavefront of the laser light is effectively controlled to ensure that it propagates through the medium homogeneously over a long distance.

Another method of attaining the stated object of the invention comprises the steps of illuminating a deformable mirror with laser light before it is admitted into a medium, allowing the reflected laser light from the mirror to be admitted into the medium through which it propagates, splitting out a portion of the laser light at a suitable site either within or outside the medium, measuring the wavefront of the laser light with a wavefront sensor, calculating the required amount of deformation of the mirror on the basis of the result of measurement and deforming the mirror which is positioned just ahead of the point of laser light incidence on the medium. In this way, the wavefront of the laser light which is about to be admitted into the medium is effectively controlled to ensure that it propagates through the medium homogeneously over a long distance.

DETAILED DESCRIPTION OF THE INVENTION

Wavefront control technology according to the invention for achieving long-distance propagation of laser light through a medium is described below with reference to two examples.

EXAMPLE 1

This example describes the first embodiment of the invention, in which all laser light in propagation is picked up from within a medium, its wavefront is measured and controlled by the required amount on the basis of the measurement, and the thus controlled laser light is returned into the medium.

Figure 5A:
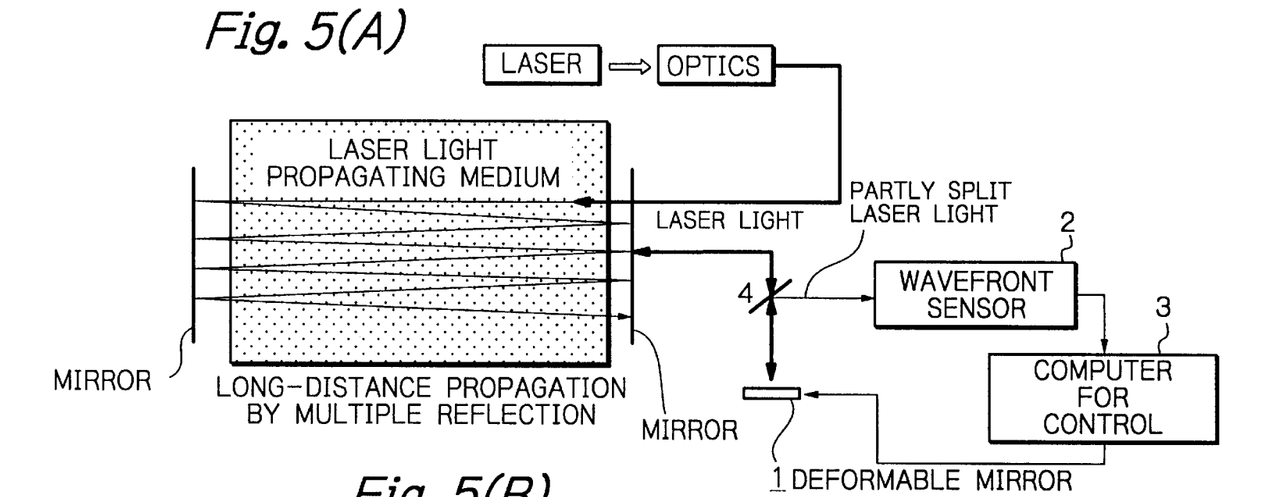
FIG. 5(A) shows the setup of an apparatus for achieving long-distance propagation of laser light according to the present invention.

As FIG. 5(A) shows, one or more beams of laser light are propagating through a medium. At a suitable site in the medium, all laser light is picked up and applied to a deformable mirror 1. Part of the reflected laser light from the mirror is split out with a beam splitter 4 or the like and its wavefront is measured with a wavefront sensor 2. On the basis of the measurement, the required amount of deformation of the deformable mirror is calculated and the mirror is deformed accordingly so as to control the wavefront of the laser light. The laser light having the controlled wavefront is admitted again into the medium and allowed to propagate over the remainder of the path, whereby the laser light can propagate through the medium homogeneously over a long distance.

Figure 5B:
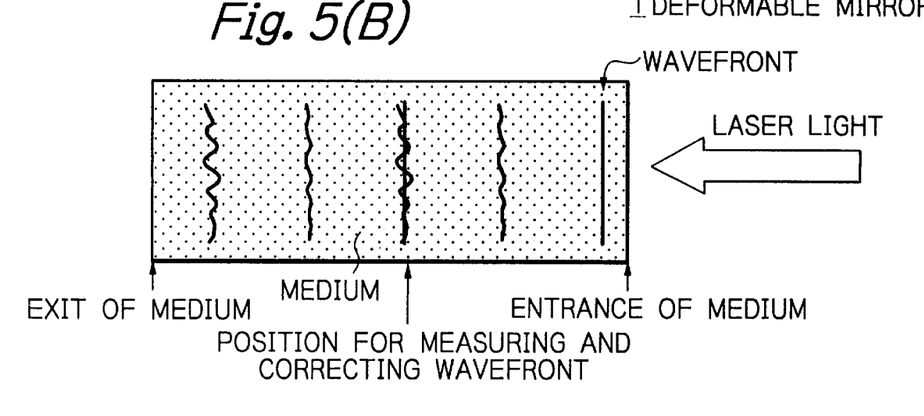
FIG. 5(B) shows the changes that occur in the wavefront of laser light when it is propagated over a long distance by means of the apparatus shown in FIG. 5(A)

As FIG. 5(B) shows, the wavefront of the laser light that has just entered the medium has intrinsic aberrations, which increase as the laser light propagates through the medium. Partway through the medium, the laser light is picked up and controlled to have a planar wavefront or any other wavefront that is optimal for propagation, admitted again into the medium, through which it propagates with a second occurrence of aberrations in the wavefront.

The optimal site in the medium at which the propagating laser light is picked up is such that the aberrations in the wavefront of the laser light finally emerging from the medium are substantially equal to those in the wavefront of the laser light which is about to be incident on the deformable mirror. If the laser light to be first admitted into the medium is a plane wave which is entirely free of wavefront aberrations, the midpoint on the medium is an optimal site for picking up the laser light.

EXAMPLE 2

This example describes the second embodiment of the invention, in which part of the laser light in propagation is picked up from within a medium and its wavefront is measured so as to control the wavefront of the laser light before it is admitted into the medium.

Figure 6A:
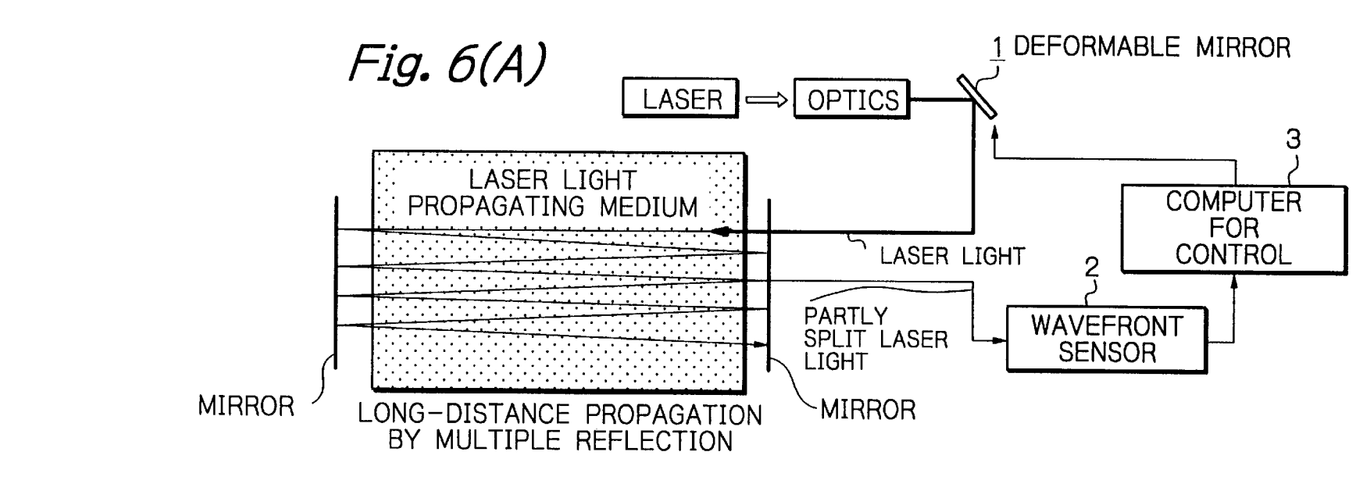
FIG. 6(A) shows the setup of another apparatus for achieving long-distance propagation of laser light according to the present invention.

As FIG. 6(A) shows, one or more beams of laser light are applied to a deformable mirror 1 before they enter a medium. The laser light reflected from the mirror is admitted into the medium, through which it propagates. At a suitable site either within or outside the medium, part of the laser light is split out by means of a beam splitter and its wavefront is measured with a wavefront sensor 2; on the basis of the measurement, the required amount of deformation of the mirror is calculated and the mirror which is positioned just before the point of entrance of the laser light into the medium is deformed accordingly so as to control the wavefront of the laser light which is about to enter the medium. As a result, the laser light can propagate through the medium homogeneously over a long distance.

Figure 6B:
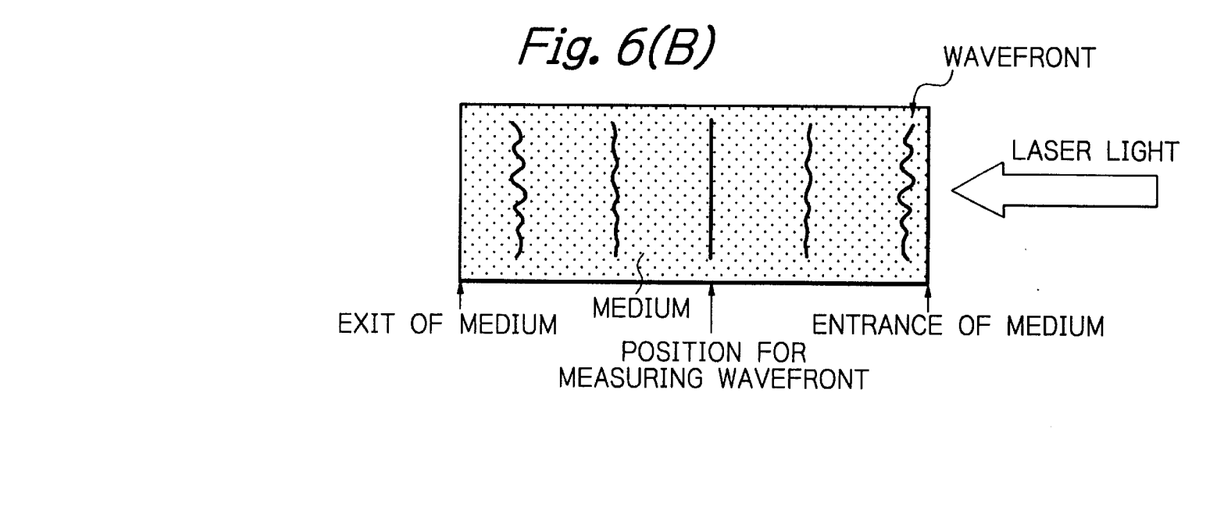
FIG. 6(B) shows the changes that occur in the wavefront of laser light when it is propagated over a long distance by means of the apparatus shown in FIG. 6(A).

As FIG. 6(B) shows, the laser light which is about to enter the medium has its wavefront deformed by the deformable mirror. As the laser light propagates through the medium to get closer to the point of wavefront measurement with the wavefront sensor, it progressively acquires a planar wavefront or any other wavefront that is optimal for propagation. With the increasing distance of propagation through the medium, the wavefront of the laser light becomes more aberrant.

The optimal site in the medium at which part of the propagating light is picked up and subjected to wavefront measurement is such that the aberrations in the wavefront of the laser light finally emerging from the medium are substantially equal to those in the wavefront of the laser light that was just applied to the deformable mirror and which is about to enter the medium. If the laser light to be first admitted into the medium is a plane wave with inherent aberrations, the midpoint on the medium is an optimal site for picking up the laser light.

According to the wavefront control method described in Example 1, all laser light propagating through a medium is extracted from within the medium at an optimal site partway through the medium; a wavefront sensor and a deformable mirror are provided at the site of laser light extraction; after wavefront control, the laser light with controlled wavefront is wholly returned into the medium. This offers the advantage of controlling and correcting not only the inherent aberrations in the wavefront of the laser light but also the aberrations that are progressively introduced by the interaction with the medium.

According to the wavefront control method described in Example 2, a deformable mirror is placed at the entrance of a medium, part of the propagating laser light is split out at an optimal site partway through the medium, and a wavefront sensor is placed at said optimal site. With the medium being positioned between the deformable mirror and the wavefront sensor, this method also has the advantage of controlling and correcting not only the inherent aberrations in the wavefront of the laser light but also the aberrations that are progressively induced by the interaction with the medium. Unlike in the first method, not all of the laser light in propagation need be picked up from within the medium but only laser light having a sufficient intensity to permit measurement with the wavefront sensor need be picked up. In addition, the picked up laser light need not be returned into the medium and this contributes to the use of very simple optics.

What is claimed is:

1. A method of correcting the wavefront of laser light traveling along a path through a medium while in the process of propagation so as to correct both irregularites in wavefront that are inherent in the laser light and irregularities which occur as the laser light travels through the medium, the method comprising:

propagating laser light through a medium, picking up all laser light, at a suitable site, from the medium through which the laser light is propagating illuminating a deformable mirror with the laser light, splitting out a portion of the laser light reflected from the deformable mirror, measuring the wavefront of the split laser light with a wavefront sensor, calculating a required amount of deformation of the mirror based on the measured wavefront, deforming the mirror by the calculated amount so as to control the wavefront of the laser light, and allowing the laser light with the controlled wavefront to be admitted again into the medium so that the laser light propagates over the remainder of the path through the medium.

2. The method of claim 1 wherein said medium is selected from the group consisting of an atom, a molecule, an ion thereof, a gas, a liquid, and a solid that contains neutral or charged ions.

3. The method of claim 1 or 2 wherein the laser light propagating through the medium is a pulsed laser of either continuous oscillation or intermittent oscillation at short intervals of approximately femtoseconds.

4. The method of claim 3 wherein the laser light propagates through the medium such that irregularities are introduced in the wavefront of the laser light on account of interaction with the medium.

5. The method of claim 1 or 2 wherein the laser light propagates through the medium such that irregularities are introduced in the wavefront of the laser light on account of interaction with the medium.

6. A method of correcting the wavefront of laser light traveling through a medium while in the process of propagation so as to correct both irregularities in wavefront that are inherent in the laser light and irregularities which occur as the laser light travels through the medium, the method comprising:

illuminating a deformable mirror with laser light before the laser light is admitted into a medium, allowing laser light reflected from the mirror to be admitted into the medium through which the laser light propagates, splitting out a portion of the laser light at a suitable site, either from the medium or from outside the medium, measuring the wavefront of the split laser light with a wavefront sensor, calculating a required amount of deformation of the mirror based on the measured wavefront, and deforming the mirror which is positioned just ahead of the point of laser light incidence on the medium.

7. The method of claim 6 wherein said medium is selected from the group consisting of an atom, a molecule, an ion thereof, a gas, a liquid, and a solid that contains neutral or charged ions.

8. The method of claim 6 or 7 wherein the laser light propagating through the medium is a pulsed laser of either continuous oscillation or intermittent oscillation at short intervals of approximately femtoseconds.

9. The method of claim 8 wherein the laser light propagates through the medium such that irregularities are introduced in the wavefront of the laser light on account of interaction with the medium.

10. The method of claim 6 or 7 wherein the laser light propagates through the medium such that irregularities are introduced in the wavefront of the laser light on account of interaction with the medium.

* * * * *

UNITED STATES PATENT AND TRADEMARK OFFICE
CERTIFICATE OF CORRECTION

PATENT NO.    : 6,370,166 B1
DATED         : April 9, 2002
INVENTOR(S)   : Katsuaki Akaoka et al.

It is certified that error appears in the above-identified patent and that said Letters Patent is hereby corrected as shown below:

<u>Column 5,</u>
Line 36, "irregularites" has been replaced with -- irregularities --.

Signed and Sealed this

Eighteenth Day of February, 2003

JAMES E. ROGAN
*Director of the United States Patent and Trademark Office*